UNITED STATES PATENT OFFICE.

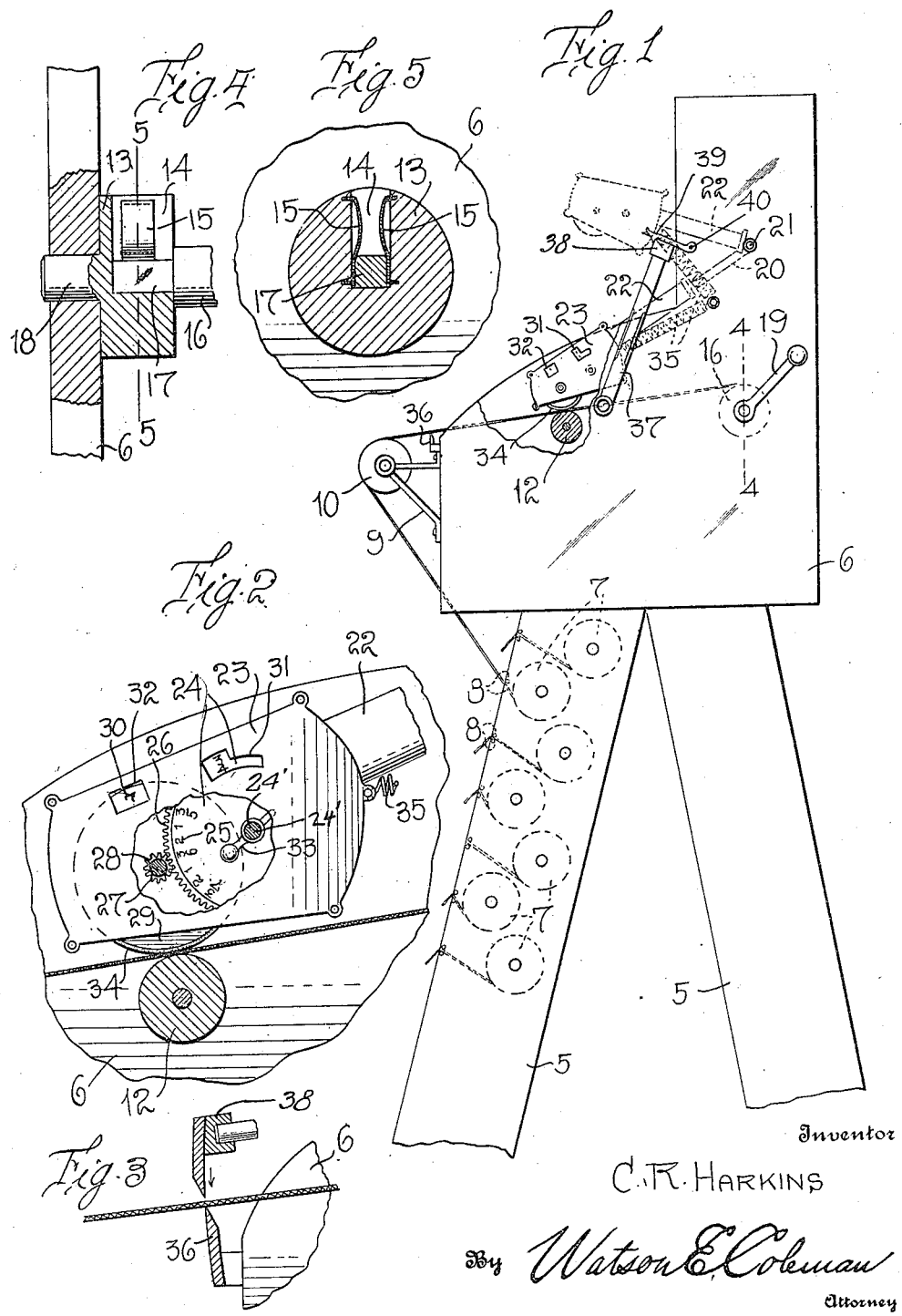

CHARLES R. HARKINS, OF OTIA, MICHIGAN.

MEASURING AND CUTTING MACHINE.

1,259,231.   Specification of Letters Patent.   Patented Mar. 12, 1918.

Application filed April 18, 1917. Serial No. 163,051.

*To all whom it may concern:*

Be it known that I, CHARLES R. HARKINS, a citizen of the United States, residing at Otia, in the county of Newaygo and State of Michigan, have invented certain new and useful Improvements in Measuring and Cutting Machines, of which the following is a specification, reference being had to the accompanying drawings.

This invention relates to improved measuring and cutting machines for oil cloth, linoleum, screen fabric, and various other flexible materials, the invention having for its primary object to provide a relatively simple and compact mechanism for measuring the material as it is withdrawn from the roll and then cutting off the measured portion.

The invention has for an additional object to provide improved means for mounting the measuring mechanism and holding the same in either its operative or inoperative position.

The invention has for one of its detail objects to provide improved means for removably mounting the roller upon which the measured portion of the material is wound, whereby said roller may be readily removed from the machine frame and replaced in its operative position.

The invention also has for its further general object to provide a machine for the above purpose which is relatively simple in its construction, not liable to get out of order, and highly convenient and serviceable in practical use.

With the above and other objects in view, my invention consists in the novel features of construction, combination and arrangement of parts to be hereinafter more fully described, claimed and illustrated in the accompanying drawing, in which, Figure 1 is a side elevation of a measuring and cutting machine constructed in accordance with the preferred embodiment of the invention, the measuring device being shown in dotted lines in an inoperative position, a portion of the frame being broken away.

Fig. 2 is an enlarged vertical section, the casing of the measuring device being partly broken away;

Fig. 3 is a detail section showing the manner of operation of the movable cutting knife;

Fig. 4 is a detail section taken on the line 4—4 of Fig. 1; and

Fig. 5 is a section taken on the line 5—5 of Fig. 4.

Referring in detail to the drawing, 5 designates the upwardly converging, supporting legs or standards, said standards being arranged in spaced pairs and rigidly connected together at their upper ends. Upon these standards, the metal frame 6 is mounted, and within said frame the mechanism to be presently described is arranged.

In suitable bearings on the corresponding standards 5 at opposite sides of the machine, trunnions on the ends of the rollers or cores 7 upon which the cloth or other flexible material is wound, are journaled. Spaced pairs of guide rods 8 are fixed at their ends on the forward edges of the standards 5, and between these respective pairs of rods, the material from the several bolts or rolls is drawn.

To the front wall of the frame 6, bearing brackets 9 are fixed, in which trunnions on the ends of the roller 10 are mounted. A second roller 12 is disposed between the side plates of the frame 6 and mounted in suitable bearings thereon. Rearwardly of and in spaced relation to the roller 12, the cylindrical bearing members 13 are rotatably mounted upon the side walls of the frame 6. Each of these bearing members is provided with a slot or channel 14 opening upon its periphery at the top of the bearing and extending downwardly to the center thereof. To the opposite side walls of the slot or groove 14 in each bearing member 13, the extremities of the leaf springs 15 are secured. The medial portions of these leaf springs are spaced from each other and from the respective side walls of the slot. The roller 16 upon which the material is adapted to be wound, is provided upon its ends with rectangular trunnions 17 which are adapted to be inserted downwardly into the slots 14. These trunnions entering between the spaced portions of the springs 15 tend to force the same apart so that said springs exert a resilient clamping pressure against the opposite side faces of the trunnions, thereby retaining the same within the slot in the bearing member. The stub shaft 18 of one of the members 13 is extended through one side wall of the frame 6, and to the same a suitable crank 19 is attached, whereby the roller 16 may be rotated.

Upon the upper end of one of the side plates of the frame 6 and to the inner face thereof, a rod 20 is pivotally secured at one of its ends, as shown at 21, and upon this rod the sleeve or tube 22 is telescopically engaged. To the forward end of this tube, a sheet metal casing 23 is suitably secured, and within this casing a registering wheel 24 is rotatably mounted. This wheel is provided upon one face and contiguous to its periphery with graduations 25 which are properly designated by numerals to indicate yards and feet. This registering wheel 24 is also provided with teeth 26 upon its periphery to mesh with the teeth of a pinion 27 fixed upon a shaft 28 journaled at its ends in the opposite side walls of the casing 23. Upon this shaft, a second wheel 29 is fixed and is likewise provided with graduations at its outer edge suitably marked, as at 30, to indicate inches. One side wall of the casing 23 is provided with sight openings 31 and 32 through which the indicative numerals on the respective registering wheels are visible. It will be understood that the gear 26 and pinions 27 are of such ratio that the registering wheels will rotate at the proper relative speeds. Upon the shaft 24' of the wheel 24, a weighted arm 33 is fixed and normally acts by gravity to move the wheel 24 to zero position.

The periphery of the wheel 29 is faced with rubber, as shown at 34, or other suitable friction material for engagement upon the periphery of the roller 12.

To the casing 23, one end of a coil spring 35 is attached, the other end of said spring being suitably fixed to the wall of the frame 6. When the sleeve or tube 22 is extended upon the pivoted rod 20 and the casing 23 swung downwardly to the position shown in full lines in Fig. 1, the spring 35 operates by contraction to cause a downward pressure of the rubber faced registering wheel 29 upon the roller 12, and when the registering device is swung upwardly and the tube 22 moved inwardly on the rod 20, as shown in dotted lines, the spring 35 also yieldingly sustains the register in such inoperative position. It will be noted that in this operative position of the register, the spring 35 exerts its pull in an angular direction with respect to the axis of the pivoted rod 20 and thereby causes the tube 22 to frictionally engage upon the rod 20 and prevent the contraction of the spring so that the wheel 29 will remain in engagement upon the roller 12. When the register is swung upwardly, the spring 35 contracts, the tension of said spring being such as to render the same sufficiently rigid to support the weight of the register and retain the same in the inoperative position shown in dotted lines in Fig. 1.

At the upper edge of the front wall of the casing 6, a knife bar 36 is secured and extends the entire width of the casing. An arm 37 is also pivoted at one of its ends upon the outer side of each of the side walls of the frame 6, and to the other ends of these arms the extremities of the movable knife bar 38 are attached. A resilient latch hook 39 is fixed at one of its ends, as at 40, to one side plate of the frame 6 and the hook on the free end of this latch plate is adapted for engagement over one end of the knife bar 38, as shown in Fig. 1, to retain the knife bar in an inoperative position. As shown in Fig. 3 of the drawing, when the knife bar is swung downwardly and forwardly, the cutting edge thereof co-acts with the cutting edge of the knife bar 36 to cut off the measured portion of the material which is drawn over the latter knife bar. Before the knife bar 38 can thus be operated, it will be understood that the register is first lifted slightly from the dotted line position seen in Fig. 1, out of the path of movement of the knife bar.

From the foregoing description, taken in connection with the accompanying drawing, the construction, manner of operation, and several advantages of my invention will be clearly and fully understood. In operation, the cloth or other material is drawn from the selected roll arranged between the standards 5 upwardly over the roller 10 and then inwardly between the side walls of the casing 6 and over the roller 12, the ends of the material being detachably connected by suitable means to the periphery of the roller 16. The register 23 is then swung downwardly to its operative position and the crank 19 turned to rotate the roller 16. The material is then drawn over the several rollers and wound upon the roller 16, and as the roller 12 is thus caused to rotate, rotation is also imparted to the wheel 29 of the register. Rotation at a relatively slow speed is transmitted to the pinion 27 and gear 26 to the wheel 24, and when the numeral 12 appears at the opening 32 indicating that one foot of the material has been withdrawn from the roll, this foot length will be indicated upon the face of the wheel 24 in the sight opening 31. When three feet have been withdrawn from the roll, the inner numeral 1 on the face of the wheel 24 will appear in the opening 31, thus indicating that one yard of the material has been wound upon the roller 16. This operation continues until the desired amount of material has been withdrawn from the roll, as will be indicated by reading the register wheels through the sight openings 31 and 32. The register is then moved to the inoperative position shown in dotted lines in Fig. 1, and the knife bar 38 released and swung downwardly to cut off the measured portion of the material in the manner above stated. Thus, it will be seen that I have produced a very simple, effective, and reliable mechanism for accurately measuring the material and then severing the same from the roll. After the desired quantity has been wound upon the roller 16 and cut off, this roller may be readily removed from the frame by forcing the trunnions thereof outwardly between the springs 15 on the bearings 13, and after the material has been removed from the roller, said roller can be as readily replaced in its operative position. It will, of course, be understood that the registering wheel 24 may be provided with sufficient graduations to measure any desired maximum quantity of the material. The mechanism being of very simple construction is not liable to get out of order and may also be manufactured at relatively small cost.

While I have herein shown and described the preferred construction and arrangement of the several elements employed, it is to be understood that the device is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:

1. In a cloth measuring mechanism, a winding roller, rotatable bearing supports for the winding roller each having a radial slot opening upon the periphery of the support, said roller having trunnions at its ends, and opposed leaf springs arranged within the slots of the bearing supports to engage the roller trunnions and removably retain the same within said slots.

2. A mechanism of the character described including a winding roller, a second roller spaced from the winding roller and over which the material is drawn, a support for said roller, a rod pivoted at one of its end to said support, a tube telescopically engaged upon said rod, a register carried by said tube and including a friction faced wheel to engage upon the latter roller when said tube is moved to an extended position with respect to the pivoted rod, and means for yieldably retaining the registering mechanism in an elevated inoperative position.

In testimony whereof I hereunto affix my signature in the presence of two witnesses.

CHARLES R. HARKINS.

Witnesses:
TERRY E. HARKINS,
GLEN E. HARKINS.

Copies of this patent may be obtained for five cents each, by addressing the "Commissioner of Patents, Washington, D. C."